Dec. 6, 1960     E. ZUCKER ET AL     2,963,114
MOTOR CONTROL SYSTEM
Filed March 20, 1958     5 Sheets-Sheet 5

Fig. 5

United States Patent Office 2,963,114
Patented Dec. 6, 1960

2,963,114

MOTOR CONTROL SYSTEM

Ernest Zucker, Hamilton, Ontario, and Eric Oldfield and Gerald L. Tiley, Burlington, Ontario, Canada, assignors to Canadian Westinghouse Company Limited, Hamilton, Ontario, Canada Filed Mar. 20, 1958, Ser. No. 722,734

Claims priority, application Canada Apr. 13, 1957

23 Claims. (Cl. 187—29)

This invention relates to control apparatus and has particular relation to apparatus for controlling the operation of hoist motors.

While generally this invention may be utilized in controlling the movement of any type of load from an initial position to any of several final positions, it is specifically described in this application as applied to a mine hoist. In a mine hoist, a skip or cage or a pair of skips or a skip or cage and a counterweight or even a single skip is adapted to be moved by a drive unit. The loading conditions of the skips or cages vary greatly from time to time. When moving skips, it is desirable that they be moved at a relatively high speed from the initial position to intermediate positions near their stopping position. As they approach their stopping position, it is desirable that the speed be reduced as rapidly as possible within permissible safety limits to a low landing speed or creep speed and continue to move at approximately that speed until the final position is reached. While these functions may be performed manually there are obvious advantages to their automatic performance. Removal of an operator of course reduces the cost of operation of the hoist. It also permits more direct control of the hoist by the user which not only may speed up operation but also may reduce the chance of error, by eliminating one of the intermediate steps in the transfer of information. Further, it may be that the operator cannot sufficiently accurately control the acceleration program for maximum efficiency and irrespective of the type of control used there obviously must be some computing function involved to maintain the same acceleration or deceleration program in the presence of widely varying loads. This is particularly true when the drive is not one that would normally be a speed controlled drive but rather a torque controlled drive.

It is then an object of this invention to provide a hoist control incorporating automatic means for performing those various functions, which might otherwise be performed by the operator.

It is a further object of this invention to provide electrical systems particularly adapted for automatic operation of a hoist.

It is a still further object of this invention to provide an automatic hoist control system with such features for checking and controlling the hoist operation, as will permit an accuracy of operation efficiency and safety of operation not hitherto attainable by previous control systems.

It is another object of this invention to provide a novel method for operating automatically a mine hoist or the like.

These and numerous other objects are attained by this invention as will be appreciated from the following specification and drawings, in which:

Fig. 5 is a diagrammatic view showing the relationship of the coils and the contacts of the relays shown in Figs. 2, 3A and 3B.

In the figures relay and contactor designations consist of letters and/or numbers while their contact designations are the same with a further number added to the end. In Fig. 5 the relays are identified at the top of the sheet and the coils and contacts of the relays are shown in the same relative positions as they appear on the sheets.

Figure 1:
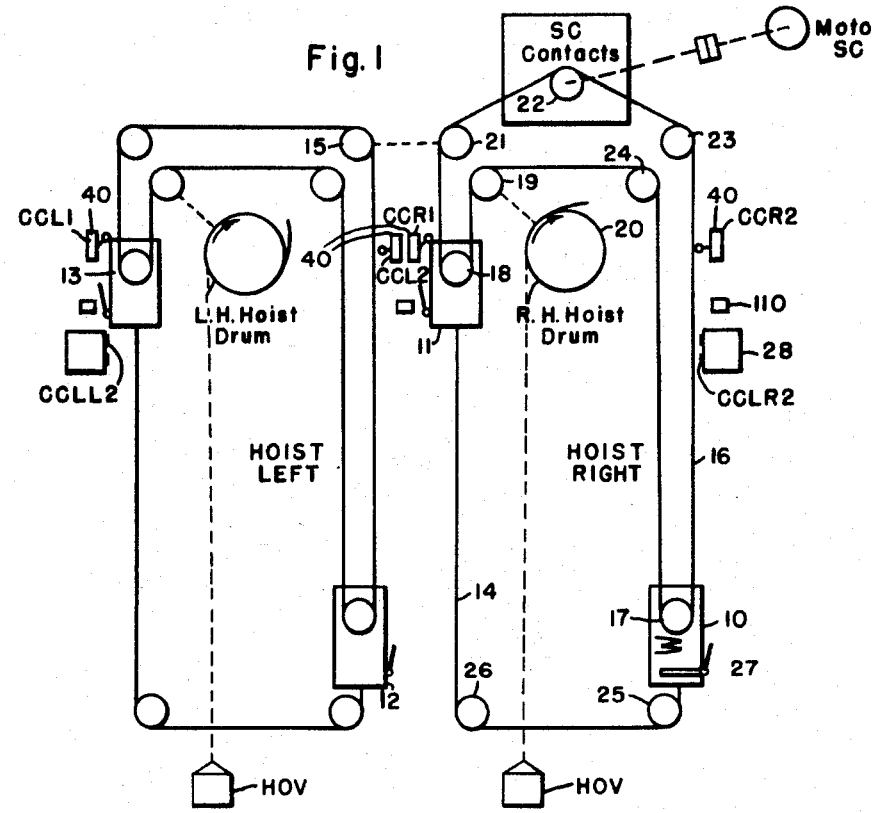
Figure 1 is a schematic representation of the type of control device utilized in the invention for the control of a two-drum hoist.

Considering first Fig. 1, there is shown a device which may be termed a simulator but due to its function it will be referred to as an "Advance Selector." In fact, this device simulates mechanically the approximate position of the skip or cage of the hoist with its position modified according to its acceleration. As this system is being described in conjunction with a double-drum hoist, the advance selector is in a duplex form, each half of the selector being controlled by one of the hoist drums. Essentially the advance selector consists of two pairs of carriages 10 and 11 which are connected together by a chain 14. They are also coupled by a chain 16 but chain 16 is not rigidly connected to the carriages but merely passes around sprockets 17 and 18. It also passes around sprockets 21, 22, 23, 24 and 19 which are mounted on a fixed frame. The lower chain 14 also passes around a pair of sprockets 25 and 26 mounted on the frame. The hoist vehicles HOV are operated by a hoist drum 20. Sprocket 19 is connected to and is in synchronism with the right-hand hoist drum 20. Disregarding all other sprockets than sprocket 19, it will be evident that a rotation of sprocket 19 will cause one of the carriages to rise and the other carriage to lower, relative to the frame. Relatively, the position of the carriage corresponds to the position of the hoist or skip in the shaft. Then as the hoist drum rotates assuming the left-hand hoist drum remains fixed, the motion of one of the carriages will simulate the motion of the skip or cage. Points in the path of travel of the carriage will therefore be considered as equivalent to points in the shaft. It is therefore possible to place control devices in the path of the carriage rather than in the shaft and they may be actuated by the motion of the carriages rather than by the actual motion of the skip as will be later seen. There are two advantages involved (1) the control devices need not be located at a remote point such as the shaft and (2) certain compensation can be made in the system for errors or for other functions which must be considered in controlling the hoist.

One of the factors which must be considered in controlling the hoist is the actual speed of the skip. In order to introduce the effect of velocity into the system, sprocket 22 is driven in accordance with acceleration or deceleration program. Sprocket 22 rotates only during acceleration or deceleration of the skip; it is rotated in one direction by motor SC (Fig. 3A) during acceleration and in the opposite direction by chain 16 during deceleration. The rotation of sprocket 22 causes a displacement of carriages 10 and 11 in addition to the displacement produced by rotation of sprocket 19. Displacement is produced in a direction corresponding to the direction in which the acceleration or deceleration is to be performed. It is for this reason that the device is called an advance selector, since the carriage travels in advance of its actual position which it would occupy if it corresponded in position exactly to the skip or cage position. The amount of advance is proportional to the velocity program and hence points encountered during the translation of the carriage are encountered in advance of the actual point being encountered by the skip or cage in the shaft. Since the amount by which the carriage is advanced is proportional to velocity of the associated skip it is possible to control the deceleration program in accordance with the actual velocity of the hoist.

Bars 110 representing levels or stopping points in the system are attached to the frame of the advance selector. When the skip or cage is to be stopped at a particular level the latch, for example latch 27 on carriage 10, engages the bar. This prevents further motion of the carriage. The hoist drum, however, continues to rotate tending to drive the chain 16. As the carriage cannot advance, the chain must simply cause the various sprockets to rotate. In so doing, it rotates sprocket 22. At the beginning of this operation, sprocket 22 had been rotated to cause displacement of the carriage now displacement of the carriage causes rotation of the sprocket.

As was previously indicated, the sprocket 22 is directly related to the acceleration or deceleration of the skip. As the sprocket is rotated the skip is decelerated until the hoist drum comes to a stop. When the drum is stopped the carriage and the skip HOV are once again in synchronism and so remain until further acceleration program is started. Other contacts are shown in the path of travel of the carriage such as contacts 28 (CCLL1, CCLR2) which permit load weighing to be performed at some point previous to the stopping point of the carriage. In this way, the deceleration program can be predetermined in accordance with the load weight.

In a double-drum hoist, it is possible to declutch one drum in order to set up a new hoisting program, that is a program where the skips move from a different level to the dump. This being the case, it is necessary that there be a control mechanism for each drum so that under no conditions can one drum get out of synchronism with its control mechanism. The left-hand portion of the duplex advance selector therefore corresponds exactly with the righ-hand section except that the driving signal is derived from the left-hand drum. A mechanical intercoupling of pulleys 21 and 15 permits a duplex operation of sprocket 22 which will be rotated in such a direction as to cause the motor to come to a standstill.

It will be understood in this description there has been no detail of the mechanical portions of this advance selector given, and mechanical details may vary according to the specific application. It has, however, been found that for convenience and accuracy the overall height of travel for the carriages should be about five feet. The carriages should be constrained to travel in a regular path by means of guide wheels which travel in some form of track. In one particular model all the chains were roller chains and the whole device was surrounded with easily removable cover plates to permit rapid access to the carriages, contacts, etc. This is a particular advantage when setting up new levels in the mine since new levels may be inserted simply by putting in stop bars on the frame of the advance selector.

Figure 2:
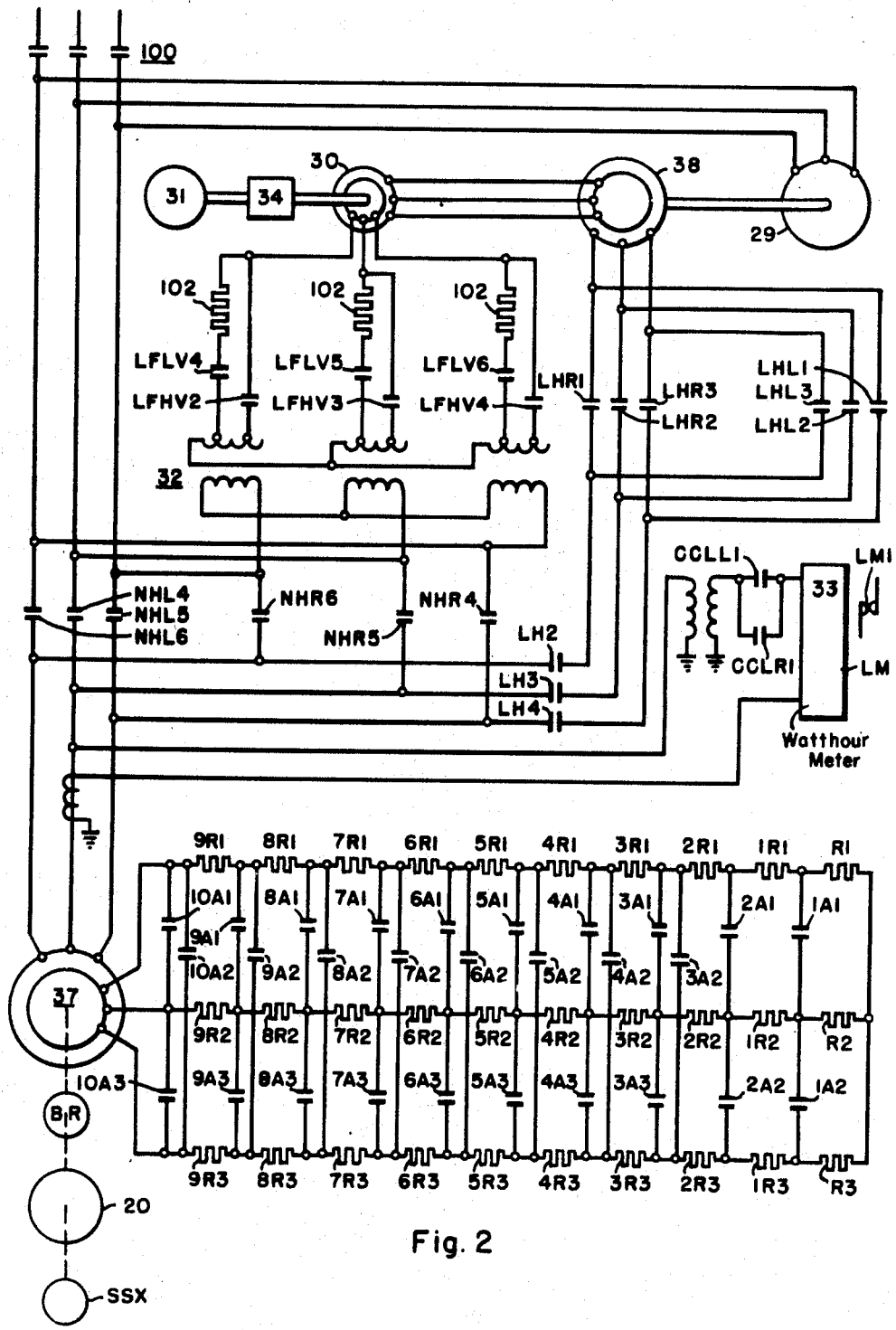
Fig. 2 is a schematic diagram of an alternating current drive and control which may be used in conjunction with the control device shown in Fig. 1.

Referring to Fig. 2, there is shown an electrical system which may be used in coordination with this advance selector to permit a suitable control of the hoist drum motors. In Fig. 2 is shown a wound rotor induction motor 37 having in its rotor circuit a normal starting and resistance controlling device. The stator of this motor is supplied selectively from a three phase 60 cycle supply which is reversible through contactors NHL or NHR or from a three phase low frequency supply which is also reversible by means of contactors LHL and LHR. To provide the necessary low frequency supply a three phase generator 38 which delivers selectively 3 and 4 cycles per second is driven by a 60 cycle induction motor 29. The induction motor 29 provided with the normal starting equipment is supplied from the 60 cycle line 100. The low frequency generator, however, must be provided with suitable excitation. This excitation comes from exciter 30 which is driven at slightly sub-synchronous speed by motor 31 through gear reducer 34. Slip rings on the exciter are provided with three phase 60 cycle current from a multitap transformer 32 through contacts of contactor LFLV and resistors 102 or through contacts of contactor LFHV directly. In operation, motor 31 which is a synchronous induction motor rotates at 1800 r.p.m.; by means of gear reducer 34 the exciter is rotated at either 1680 or 1710 r.p.m. the former speed giving a 4 cycle output and the latter speed giving a 3 cycle output. The output of this exciter when applied to the generator 38 is in effect amplified by the generator 38 and may be applied to motor 37.

A power measuring circuit is included in the normal frequency supply to the hoist motor 37 to measure the load on the skip or cage. This includes a watthour meter 33 which produces a series of pulses whose repetition frequency is determined by the instantaneous watts consumed by the motor. To obtain an accurate measure of the load, these pulses are counted over a predetermined period. The watthour meter is supplied from a potential transformer connected to the three phase supply of motor 37 and a current transformer coupled to one of the supply buses. When motor 37 is operating and contacts CCLL1 or CCLR1 are closed, the watthour meter 33 causes contacts LM1 (Fig. 3B) to open and close a certain number of times depending on the watts consumed.

Figure 3A:
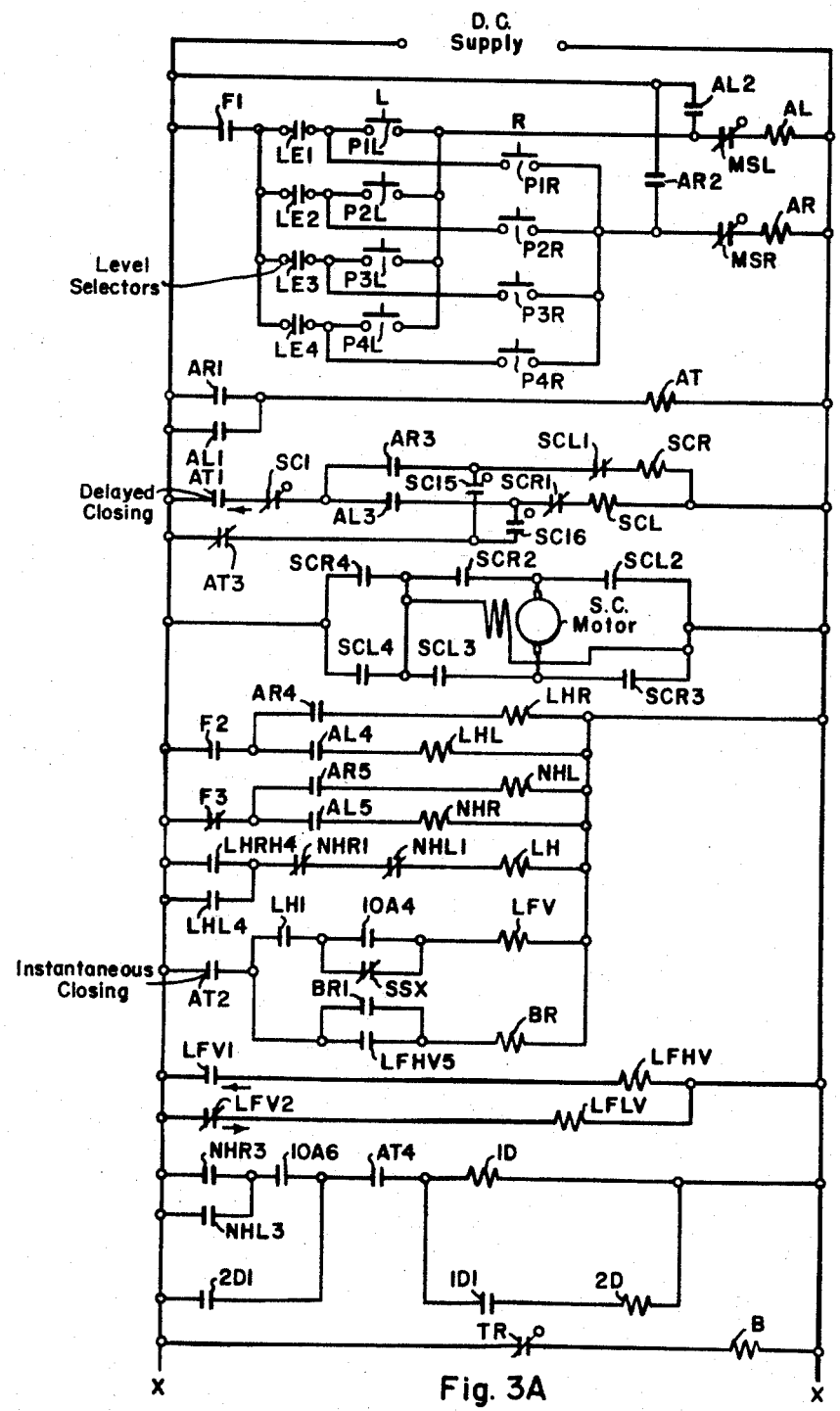
Figs. 3A and 3B are a single schematic diagram of a control system for a double-drum four-level skip hoist.
Figure 3B:
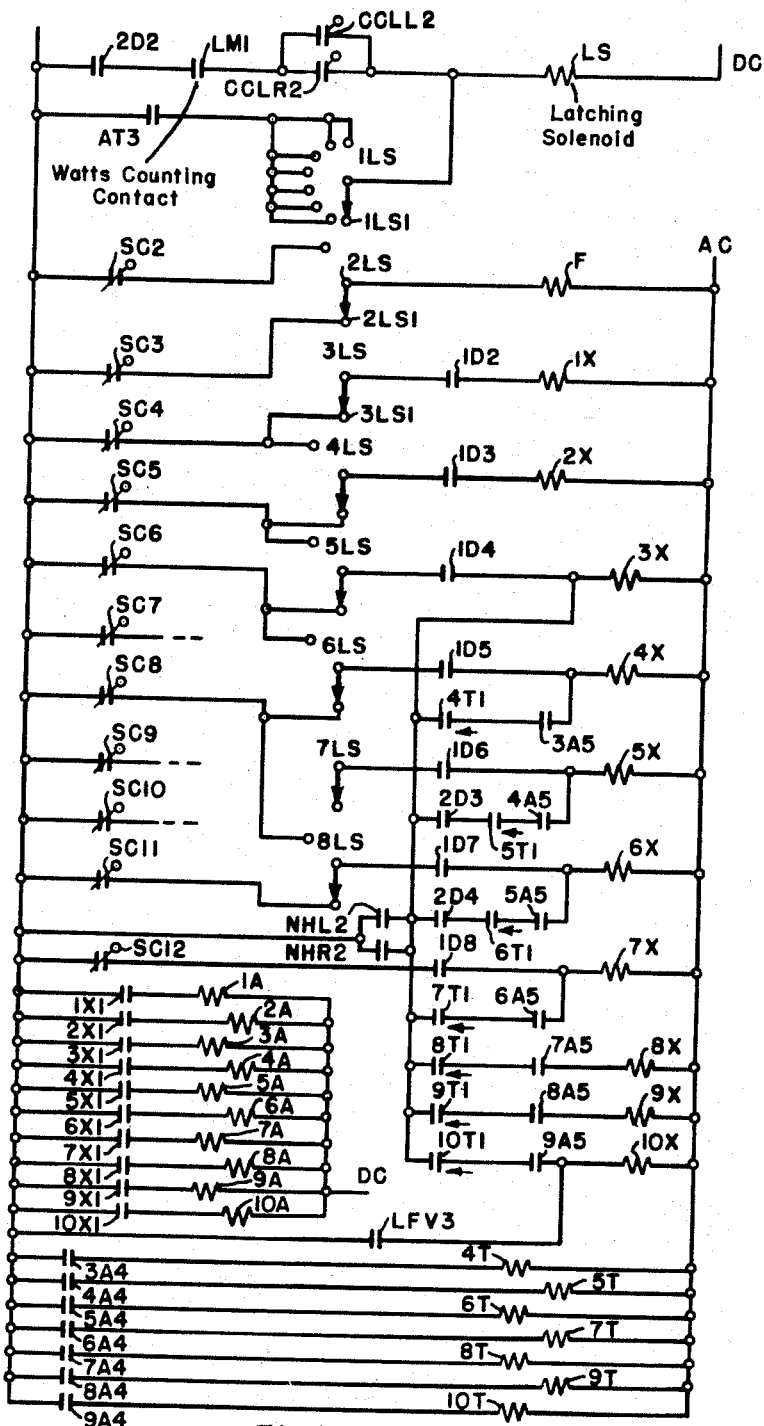

In order to describe the necessary relationship between the control mechanism and the control system a fully automatic alternating current system for four level skip hoist operation is illustrated in Figs. 3A and 3B. This system in effect interrelates the control system of Fig. 2 and the controller of Fig. 1. There is shown a series of pushbuttons P1L to P4L and P1R to P4R. A pair of these pushbuttons is located at each level and the operative level i.e., the level to which the skip will go is selected by operation of selector switch contacts LE1 to LE4.

Assuming that the left-hand skip is at a level near to the bottom of the hoist shaft and the advance selector is in the neutral position with carriage 12 in its upper position. The switch 40 which is engaged by the carriage 12 controls contacts SC–3 which will be closed normally so that relay F is energized. Now to raise this skip to the dump, the operator will set one of the level selections, say LE1 and will press one of the hoist left pushbuttons, for example P1L, to complete the circuit through F1, LE1 and magnet switch contacts MSL to energize relay AL. Similarly, if the right-hand skip had been at the level, operation of one of the hoist right pushbuttons would have completed circuit for relay AR. When either of these relays operate they lock in through their own holding contacts AL2 or AR2, respectively.

Before the hoist brakes are released it is necessary to apply torque in gradual stages starting with low frequency low voltage with all resistance in the rotor circuit, then short circuiting the rotor and finally stepping up to low frequency high voltage. The hoist brakes are then released.

These functions are performed in the following sequence:

When contacts AR4 or AL4 close relays LHR or LHL are energized through contact F2 which is now closed. This selects the correct polarity of low frequency for the hoist motor. Also contacts LHR4 or LHL4 will close to energize the coil of contactor LH through back contacts NHR1 and NHL1. Contactor LH closes to apply low frequency low voltage to the hoist motor because relay LFLV is energized through contacts LFV2.

When contacts AR1 or AL1 close, timing relay AT is energized. Instantaneous contacts of this relay AT2 close so that when the contacts LH1 close, relay LFV, the low frequency voltage relay, is energized through contacts SSX of the speed sensitive switch. Instantaneous contact AT3 also opens preventing resetting of the motor SC through switches SC15 or SC16 once the motor is energized.

SSX is a mechanically actuated overspeed contact mounted on motor 37 and has normally closed contacts. When relay LFV is energized, instantaneous contacts LFV3 close to energize relay 10X which operates to energize rotor contact 10A to short circuit the hoist motor rotor. After a slight delay (indicated by arrows in Figs. 3A and 3B), during which the motor is supplied with low frequency low voltage to take up slack in the gear etc., contacts LFV1 will close and contacts LFV2 will open. This causes relay LFHV to energize and relay LFLV to deenergize. Contacts of these relays are shown on Fig. 2 and it will be seen that the low frequency voltage is increased by the shorting out of resistors and the stepping up of the supply voltage from the three phase transformer supplying the excitation.

When contacts LFHV5 close relay BR is energized and releases the hoist brakes. When BR closes contacts BR–1, it holds off the hoist brakes until the completion of the wind when relay contacts AT2 open. It is desirable to creep out of the horns for a certain distance and this distance is represented by the time delay of contacts AT1 of relay AT. After this predetermined time delay, contacts AT1 close and depending upon whether contacts AR3 or AL3 are closed relays SCR or SCL will energize through contacts SCL1, AR3, SC1, AT1 or contacts SCR1, AL3, SC1 and AT1.

The speed cam switch driving motor SC has a field supplied with current whenever SCR4 or SCL4 is closed. Its armature is provided with current by the two contacts SCR2 and SCR3 or contacts SCL2 and SCL3. The closing of contacts of relay SCR causes rotation in one direction while closing of contacts of relay SCL causes rotation in the opposite direction as will be evident from the circuit. Rotation of motor SC causes contact SC to open progressively starting with SC–12.

With the arrangement shown, when the motor drives the cam switch round, all SC contacts open, deenergizing the field of relay F. When the switch has rotated almost 180°, the opening of contacts SC–1 deenergizes relays SCR or SCL, thereby stopping the motor.

When relay F is deenergized contacts F2 open and contacts F3 close. Low frequency is thereby removed from the hoist motor by the deenergizing of relay LHR or LHL and contactor LH and normal frequency is applied to the motor as follows: contact NHR or NHL is energized through contact F3 and AR5 or AL5. When contactor LH is deenergized the opening of contacts LH1 deenergize relay LFV and contacts LFV3 open to deenergize rotor interposing relay 10X and thereby rotor contactor 10A. The closing of contacts NHL2 or NHR2 energizes rotor interposing relay 3X which in turn energizes rotor contactor 3A. When contacts 3A1, 3A2 and 3A3 close the amount of resistance in the rotor circuit of motor 37 is reduced thereby resulting in maximum torque being developed. Contacts 3A4 closing energize timing relay 4T and contacts 3A5 closing set up the circuit to the rotor interposing relay 4X. After a predetermined time delay contacts 4T1 close thereby energizing 4X which in turn energizes rotor contactor 4A to cut out further rotor resistance as the hoist accelerates. Contacts 4A, 4A4 close to energize relay 5T and thus the sequence is continued until eventually the hoist motor rotor is short circuited by the energizing of contactor 10A, by the contact of relay 10X.

When 10A6 closes relay 1D is energized through contacts NHR3 or NHL3, 10A6 and AT4. Contacts 1D1 then close to energize the coil of 2D. Contacts 2D1 then close to bridge out the contacts of NHR3 or NHL3 and contacts 10A6. These two D relays serve to set up the deceleration circuits until at the end of the operation, contacts AT4 open to deenergize them. The hoist is now running at full speed with its rotor short circuited.

Just before the point at which deceleration is due to commence is reached, contacts CCLL1 or CCLR1 close as described previously and measure the load. During the load measuring period contacts CCLL2 or CCLR2 close to set up the circuit to the stepping relay coil LS through contacts 2D2 (now closed) and LM1. Each time contacts LM1 close this coil is energized and steps the relay contact fingers on to the next studs. The final position of these fingers depends upon the number of pulses received during the load measuring period and the number of times which contacts LM1 open and close. It will also be noted that during the full speed portion of the trip all contacts SC2 through SC12 are open. It will be noted also that the stepping switch coil is designated LS whereas the banks are designated 1LS, 2LS, 3LS, 4LS, 6LS, 7LS, and 8LS, respectively. The specific contacts on the decks are designated 1LS1, for example, or 2LS1, etc.

Figure 4:
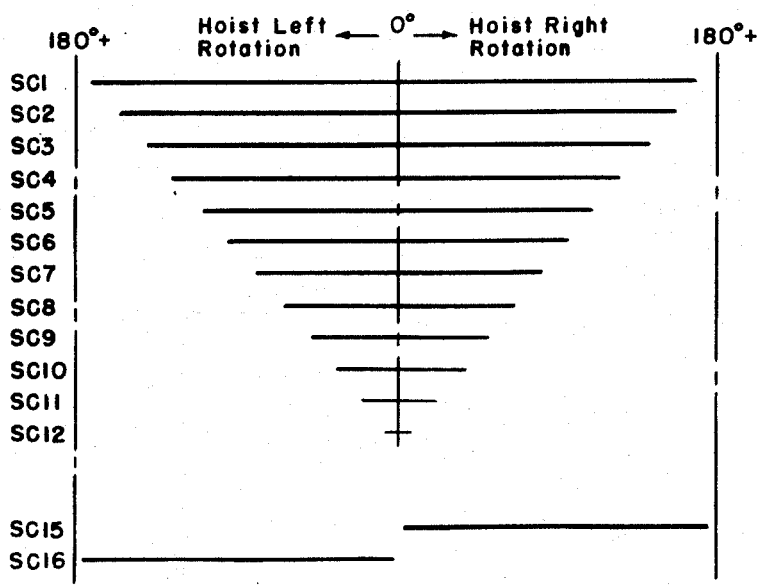
Fig. 4 is a diagram useful in explaining the functions of the speed cam switch referred to in Fig. 3A.

The complete circuit for the deceleration program is not shown due to its complexity. However, two examples are illustrated. A clear understanding of the operation of switch cams SC will be had from Fig. 4. In this diagram rotation of motor SC is graphically represented in horizontal direction in degrees and about a zero line, assuming a maximum rotation of 180° in either direction. The SC contacts are shown by the solid black line representing the period in which a particular contact is closed. Absence of the black line indicates that the contact is open.

As the sprocket 22 is rotated it causes SC to rotate back from its maximum position assuming that it has advanced from setting 180° positive and under the light load program shown with none of the LS contacts advanced from the first step. When SC3 contacts close relay F is energized and substitutes a low frequency supply for the normal frequency supply as previously described, all rotor resistance being inserted by the opening of contact NHL2 or NHR2. After the hoist travels a little further contacts SC4 will close to energize coil of relay 1X through contacts 1D2 thereby cutting out a portion of the rotor resistance. Subsequent closing of contacts SC5, through SC11 causes motor rotor resistance to be cut out of circuit until the final closing of contacts SC12 energize relay 7X through contact 1D8. Relays 8X, 9X and 10X then pick up in sequence through the timing circuit as for normal operation. As soon as the rotor is short circuited by the closing of contacts 10A1, 10A2 and 10A3, contacts 10A4 close to energize relay LFV and increase the low frequency voltage. In case the hoist slows to a creep speed before contacts 10A4 have closed, contacts SSX will close to perform the same function. Thus as soon as the hoist has reached creep speed the rotor is short circuited and the low frequency voltage increased to produce the high motoring torque required. The hoist now continues to creep into the horns until the magnet switch contacts MSL or MSR open to deenergize relay AL or AR. The deenergizing of one or another of these relays will deenergize relay AT and thence the brake relay BR and the brakes will be applied as the hoist comes to rest with all power removed from motor 37. By means of suitable connections between the contacts SC2 through SC12 and the contacts 1LS1, etc., to 8LS1 etc., of the stepping relay, varying loads are programmed to give consistent deceleration speeds.

As will be seen from the foregoing we have provided an improved control system for hoist motors and it will be evident that numerous alternative arrangements may be substituted for the specific circuits and apparatus shown without departing from the scope of our invention.

For example, the particular alternating current supply system, braking programming, or cage control circuits, may be modified or replaced by equivalents as will be appreciated by those skilled in the art.

We claim as our invention:

1. Control apparatus for an alternating current hoist motor driving a hoist vehicle comprising first means to be connected to said motor for supplying to said motor power at a first frequency at which said motor operates at normal speed and torque, second means to be connected to said motor for supplying to said motor power at a second frequency substantially lower than said first frequency, a simulator including a carriage to be connected to said motor and assuming a setting corresponding to the position of said vehicle modified by the velocity of said vehicle, and means connected to said carriage and responsive to the setting thereof for selectively connecting said first means or said second means to said motor depending on said setting.

2. Apparatus for operating an alternating current hoist motor driving a hoist vehicle through driving mechanism in moving said vehicle from a first position to a second position there being slack between said motor and said mechanism, the said apparatus comprising means to be connected to said motor impressing on said motor power at a first voltage and at a first frequency substantially lower than commercial frequency to cause said motor to take up said slack, means to be connected to said motor for interrupting the impressing of said power at said first voltage and frequency and impressing on said motor power at a second voltage higher than said first voltage and at said first frequency to cause said vehicle to move out of said first position at a low speed, means to be connected to said motor for interrupting the impressing of said power at said second voltage and first frequency and impressing on said motor power at said commercial frequency to cause said vehicle to move at a substantially higher speed towards said second position, and means to be connected to said motor and actuated when said vehicle approaches said second position for interrupting the impressing of power at said commercial frequency and again impressing on said motor power at said first frequency.

3. Apparatus for operating an alternating current hoist motor driving a hoist vehicle through driving mechanism in moving said vehicle from a first position to a second position there being slack between said motor and said mechanism, the said apparatus comprising means to be connected to said motor for impressing on said motor power at a first voltage and at a first frequency substantially lower than commercial frequency to cause said motor to take up said slack, means to be connected to said motor for interrupting the impressing of said power at said first voltage and frequency and impressing on said motor power at a second voltage higher than said first voltage and at said first frequency to cause said vehicle to move out of said first position at a low speed, means to be connected to said motor for interrupting the impressing of said power at said second voltage and first frequency and impressing on said motor power at said commercial frequency to cause said vehicle to move at a substantially higher speed towards said second position, means to be connected to said motor and actuated when said vehicle approaches said second position for interrupting the impressing of power at said commercial frequency and again impressing on said motor power at said first frequency and said first voltage to reduce the speed of said vehicle, and means to be connected to said motor and actuated when the speed of said vehicle has been reduced to a low magnitude for interrupting the impressing of said power at said first frequency and first voltage and impressing on said motor power at said first frequency and at said second voltage.

4. Apparatus for operating an alternating current hoist motor driving a hoist vehicle through driving mechanism in moving said vehicle from a first position to a second position there being slack between said motor and said mechanism, said motor having braking means while unactuated for applying a brake to said motor, the said apparatus comprising means to be connected to said motor for impressing on said motor power at a first voltage and at a first frequency substantially lower than commercial frequency to cause said motor to take up said slack, said braking means remaining unactuated while said power at said first frequency and first voltage is being impressed, means to be connected to said motor for interrupting the impressing of said power at said first voltage and frequency and impressing on said motor power at a second voltage higher than said first voltage and at said first frequency and for actuating said braking means to release said brake to cause said vehicle to move out of said first position at a low speed, means to be connected to said motor for interrupting the impressing of said power at said second voltage and first frequency and impressing on said motor power at said commercial frequency to cause said vehicle to move at a substantially higher speed towards said second position, means to be connected to said motor and actuated when said vehicle approaches said second position for interrupting the impressing of power at said commercial frequency and again impressing on said motor power at said first frequency and said first voltage to reduce the speed of said vehicle, and means to be connected to said motor and actuated when the speed of said vehicle has been reduced to a low magnitude for interrupting the impressing of said power at said first frequency and first voltage and impressing on said motor power at said first frequency and at said second voltage.

5. Control apparatus for an alternating-current hoist motor driving a hoist vehicle comprising first power-supply means for supplying power at commercial frequency, second power-supply means for supplying power at a frequency substantially lower than commercial frequency, first connecting means connected to said motor when actuated connecting said first power-supply means to said motor, second connecting means connected to said motor when actuated connecting said second power-supply means to said motor, a simulator including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting.

6. Control apparatus for an alternating-current hoist motor driving a hoist vehicle comprising first power-supply means for supplying power at the rated frequency of said motor, second power-supply means for supplying power at a frequency substantially lower than said rated frequency, first connecting means connected to said motor when actuated connecting said first power-supply means to said motor, second connecting means connected to said motor when actuated connecting said second power supply means to said motor, a simulator including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting.

7. Control apparatus for an alternating-current hoist motor driving a hoist vehicle comprising first power-supply means for supplying power at commercial frequency, second power-supply means for supplying power at a frequency substantially lower than commercial frequency, first connecting means connected to said motor when actuated connecting said first power-supply means to said motor, second connecting means connected to said motor when actuated connecting said second power-supply means to said motor, a linear differential simulator connected to said vehicle and including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting.

8. Control apparatus for an alternating-current hoist motor driving a hoist vehicle comprising first power-supply means for supplying power at commercial frequency, second power-supply means for supplying power at a plurality of frequencies substantially lower than commercial frequency, first connecting means connected to said motor when actuated connecting said first power-supply means to said motor, second connecting means connected to said motor when actuated connecting said second power-supply means to said motor, said second means being selectively actuable to connect said second power-supply means so that power is supplied by said last-named means at one of said plurality of frequencies, a simulator including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting, said second connecting means being selectively actuated to supply power at one of said frequencies.

9. Control apparatus for an alternating-current hoist motor driving a hoist vehicle comprising first power-supply means for supplying power at commercial frequency, second power-supply means for supplying power at a frequency substantially lower than commercial frequency and at a plurality of potentials, first connecting means connected to said motor when actuated connecting said first power-supply means to said motor, second connecting means connected to said motor when actuated connecting said second power-supply means to said motor, said second means being selectively actuable to connect said second power-supply means so that power is supplied by said last-named means at one of said plurality of potentials, a simulator including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting, said second connecting means being selectively actuated to supply power at one of said plurality of potentials.

10. Control apparatus for an alternating-current hoist motor of the wound-rotor induction type driving a hoist vehicle comprising variable resistance means connected to the rotor of said motor, first power-supply means for supplying power at commercial frequency, second power-supply means for supplying power at a frequency substantially lower than commercial frequency, first connecting means connected to said motor when actuated connecting said first power-supply means to said motor, second connecting means connected to said motor when actuated connecting said second power-supply means to said motor, a simulator including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting, said first and second means each including means for varying said variable resistance means.

11. Control apparatus for an alternating-current hoist motor of the wound-rotor induction type driving a hoist vehicle comprising variable resistance means connected to the rotor of said motor, first power-supply means for supplying power at commercial frequency, second power-supply means for supplying power at a frequency substantially lower than commercial frequency, first connecting means connected to said motor when actuated connecting said first power-supply means to said motor, second connecting means connected to said motor when actuated connecting said second power-supply means to said motor, a simulator including a carriage connected to said vehicle and assuming a setting corresponding to the position of said vehicle modified by the velocity of said vehicle, and means connected to said carriage and responsive to the setting thereof for selectively actuating said first connecting means or said second connecting means depending on said setting, said first and second means each including means for varying said variable resistance means in accordance with a predetermined program.

12. Control apparatus for an alternating-current hoist motor of the wound-rotor induction type driving a hoist vehicle comprising variable resistance means connected to said rotor of said motor, first power-supply means for supplying power at commercial frequency, second power-supply means for supplying power at a frequency substantially lower than commercial frequency, first connecting means connected to said motor when actuated connecting said first power-supply means to said motor, second connecting means connected to said motor when actuated connecting said second power-supply means to said motor, a simulator including a carriage connected to said vehicle and assuming a setting corresponding to the position of said vehicle modified by the velocity of said vehicle, means connected to said carriage and responsive to the setting thereof for selectively actuating said first connecting means or said second connecting means depending on said setting, and programming means connected to said first and second connecting means and responsive to the load on said motor for programming the variation of the resistance of said varying means.

13. Control apparatus for an alternating-current hoist motor of the wound-rotor induction type driving a hoist vehicle comprising variable resistance means connected to the rotor of said motor, first power-supply means for supplying power at commercial frequency, second power-supply means for supplying power at a frequency substantially lower than commercial frequency, first connecting means connected to said motor when actuated connecting said first power-supply means to said motor, second connecting means connected to said motor when actuated connecting said second power-supply means to said motor, a simulator including a carriage connected to said vehicle and assuming a setting corresponding to the position of said vehicle modified by the velocity of said vehicle, means connected to said carriage and responsive to the setting thereof for selectively actuating said first connecting means or said second connecting means depending on said setting, and means connected to said motor and responsive to the load thereon for varying said variable resistance means.

14. Control apparatus for an alternating-current hoist motor of the type having a wound rotor driving a hoist vehicle between a first position and a second position comprising variable resistance means connected to said rotor of said motor, first power-supply means of commercial frequency, second power-supply means of frequency substantially lower than commercial frequency and of a first voltage, third power-supply means of frequency substantially lower than commercial frequency and of a second voltage higher than said first voltage, first connecting means connected to said motor when actuated connecting said first supply means to said motor, means responsive to said vehicle when said vehicle is between a first and second position for actuating said first connecting means, second connecting means connected to said motor when actuating for connecting said second supply means to said motor, means responsive to said vehicle when it is near said second position for stopping the actuation of said first connecting means and for actuating said second means, means responsive to said vehicle when it is near said second position and connected to said resistance means for reducing said resistance means, means responsive to said reducing means when said reducing means has reduced said resistance to a low magnitude for stopping the actuation of said second connecting means and actuating said third connecting means, vehicle speed responsive switch means, and means connected to said switch means and operable if the speed of said vehicle reaches a predetermined low magnitude before said reducing means reduces said resistance to a low magnitude for stopping the actuation of said second connecting means and actuating said third connecting means.

15. Apparatus for operating an alternating current hoist motor of the wound-rotor type having variable resistance in its rotor circuit, said motor driving a hoist vehicle through driving mechanism in moving said vehicle from a first position to a second position there being slack between said motor and said mechanism, the said apparatus comprising means to be connected to said motor for impressing on said motor power at a first voltage and at a first frequency substantially lower than commercial frequency to cause said motor to take up said slack, means connected to said impressing means for substantially reducing said resistance, means to be connected to said motor for interrupting the impressing of said power at said first voltage and frequency and impressing on said motor power at a second voltage higher than said first voltage and at said first frequency to cause said vehicle to move out of said first position at a low speed, means to be connected to said motor for interrupting the impressing of said power at said second voltage and first frequency and impressing on said motor power at said commercial frequency and for substantially increasing said resistance to cause said vehicle to move at a substantially higher speed towards said second position, and means to be connected to said motor and actuated when said vehicle approaches said second position for interrupting the impressing of power at said commercial frequency and again impressing on said motor power at said first frequency.

16. Control apparatus for an alternating-current hoist motor driving a hoist vehicle comprising first means to be connected to said motor for supplying to said motor power at a first frequency at which said motor operates at normal speed and torque, second means to be connected to said motor for supplying to said motor power at a second frequency substantially lower than said first frequency, means connected to said motor for programming the supply of power to said motor from said first means or said second means in accordance with the load on said hoist vehicle, and the desired operation of said vehicle, a simulator including a carriage, means connecting said simulator to said motor and to said programming means to actuate said carriage in accordance with the operations of said motor and said programming means, so that said carriage is set corresponding to the position of said vehicle and the velocity of said vehicle, and means connected to said carriage and responsive to the setting thereof for selectively connecting said first means or said second means to said motor depending on said setting and, prior to said connecting, for selectively conditioning said motor to operate in accordance with the load and desired operation of said vehicle when said first means or said second means is connected to said motor.

17. Control apparatus for an alternating-current hoist motor driving a hoist vehicle comprising first means to be connected to said motor for supplying to said motor power at a first frequency at which said motor operates at nominal speed and torque, second means to be connected to said motor for supplying to said motor power at a second frequency substantially lower than said first frequency, a simulator including a carriage, auxiliary motor means connected to said motor for selectively programming the supply of power to said motor from said first and said second means in accordance with a preset program, means connecting said simulator to said hoist when actuable for moving said carriage in accordance with the motion of said hoist, means connecting said simulator to said auxiliary motor means for moving said carriage in accordance with the motion of said auxiliary motor means, and means responsive to the position of said carriage for selectively connecting said first or said second means to said motor and for presetting said program.

18. Control apparatus for an alternating-current hoist motor driving a hoist vehicle comprising first means to be connected to said motor for supplying to said motor power at a first frequency at which said motor operates at nominal speed and torque, second means to be connected to said motor for supplying to said motor power at a second frequency substantially lower than said first frequency, a simulator including a carriage, auxiliary motor means connected to said motor for selectively programming the supply of power to said motor from said first and said second means in accordance with a preset program, differential means connecting said simulator to said hoist and to said auxiliary motor means for moving said carriage in accordance with the motions of said hoist and said motor means, and means responsive to the position of said carriage for selectively connecting said first or said second means to said motor and for presetting said program.

19. Control apparatus for an alternating-current hoist motor driving a hoist vehicle comprising first means to be connected to said motor for supplying to said motor power at a first frequency at which said motor operates at nominal speed and torque, second means to be connected to said motor for supplying to said motor power at a second frequency substantially lower than said first frequency, auxiliary motor means, control means connected to said auxiliary motor means and to said first and said second means and to said hoist motor actuable by said auxiliary motor means for selectively connecting said first and said second means to said hoist motor to accelerate said hoist during a raising or a lowering operation of said hoist, a simulator including a carriage, means connecting said simulator to said hoist to cause said carriage to have a first motion correspondingly to said hoist during a raising or lowering operation, means connecting said simulator to said auxiliary motor means to superimpose on said first motion of said carriage, a second motion corresponding to the movement of said auxiliary motor means whereby said carriage has a position in advance of that corresponding to said hoist, and means responsive to the position of said carriage for selectively connecting said first and second power supply means to said hoist motor to decelerate said hoist.

20. Control apparatus for an alternating-current hoist motor driving a hoist vehicle comprising first means to be connected to said motor for supplying to said motor power at a first frequency at which said motor operates at nominal speed and torque, second means to be connected to said motor for supplying to said motor power at a second frequency substantially lower than said first frequency, auxiliary motor means, control means connected to said auxiliary motor means and to said first and said second means and to said hoist motor actuable by said auxiliary motor means for selectively connecting said first and said second means to said hoist motor and for programming the supply of power from said first and second means to said hoist motor to accelerate said hoist during a raising or a lowering operation of said hoist, a simulator including a carriage, means connecting said simulator to said hoist to cause said carriage to have a first motion correspondingly to said hoist during a raising or lowering operation, means connecting said simulator to said auxiliary motor means to superimpose on said first motion of said carriage, a second motion corresponding to the movement of said auxiliary motor means whereby said carriage has a position on advance of that corresponding to said hoist, and means responsive to the position of said carriage for selectively connecting said first and second power supply means to said hoist motor and for programming the supply of power from said first and second means to said hoist motor to decelerate said hoist.

21. Control apparatus for an alternating-current hoist motor driving a hoist vehicle comprising first means to be connected to said motor for supplying to said motor power at a first frequency at which said motor operates at nominal speed and torque, second means to be connected to said motor for supplying to said motor power at a second frequency substantially lower than said first frequency, auxiliary motor means, control means connected to said auxiliary motor means and to said first and said second means and to said hoist motor actuable by said auxiliary motor means for selectively connecting said first and said second means to said hoist motor and for programming the supply of power from said first and second means to said hoist motor to accelerate said hoist during a raising or a lowering operation of said hoist, a simulator including a carriage, means connecting said simulator to said hoist to cause said carriage to have a first motion correspondingly to said hoist during a raising or lowering operation, means connecting said simulator to said auxiliary motor means to superimpose on said first motion of said carriage, a second motion corresponding to the movement of said auxiliary motor means whereby said carriage has a position on advance of that corresponding to said hoist, and means responsive to the position of said carriage for conditioning said motor to have power supplied thereto from said first and second means in accordance with a deceleration program dependent on the load on said hoist, and additional means responsive to the position of said carriage for selectively connecting said first and second power supply means to said hoist motor and for programming the supply of power from said first and second means to said hoist motor in accordance with said deceleration program to decelerate said hoist.

22. Apparatus for supplying power from a commercial power-supply source operating at commercial frequency to a motor comprising converting means connected to said source for deriving from said source power at a substantially lower frequency than commercial frequency, auxiliary motor means, means connected to said motor and to said auxiliary motor means actuable by said auxiliary motor means for selectively connecting said motor directly to said source or to said converting means to supply to said motor power at commercial or at said lower frequency respectively, a simulator including a carriage, means connecting said simulator to said motor to impose on said carriage a first movement corresponding to the motion of said motor, means connecting said simulator to said auxiliary motor means to superimpose on said first movement a second movement corresponding to the motion of said auxiliary motor means, and means responsive to the position of said carriage for selectively connecting said motor to said commercial source and to said converting means in the absence of actuation as aforesaid by said auxiliary motor means.

23. Apparatus for supplying power from a commercial power-supply source operating at commercial frequency to a motor comprising converting means connected to said source for deriving from said source power at a substantially lower frequency than commercial frequency, auxiliary motor means, means connected to said motor and to said auxiliary motor means actuable by said auxiliary motor means for selectively connecting said motor directly to said source or to said converting means to supply to said motor power at commercial or at said lower frequency respectively, a simulator including a carriage, means connecting said simulator to said motor to impose on said carriage a first movement corresponding to the motion of said motor, means connecting said simulator to said auxiliary motor means to superimpose on said first movement a second movement corresponding to the motion of said auxiliary motor means, and means responsive to the position of said carriage for selectively connecting said motor to said commercial source and to said converting means in the absence of actuation as aforesaid by said auxiliary motor means and for causing power to be supplied to said motor from said source and said converting means in accordance with a program dependent on the load of said motor.

References Cited in the file of this patent

UNITED STATES PATENTS

| | | |
|---|---|---|
| 1,347,751 | McLain | July 27, 1920 |
| 2,221,395 | Dunn | Nov. 12, 1940 |
| 2,271,998 | Dunn | Feb. 3, 1942 |
| 2,510,151 | Stewart et al. | June 6, 1950 |
| 2,581,245 | Eames | Jan. 1, 1952 |
| 2,657,765 | Savage | Nov. 3, 1953 |
| 2,785,365 | Wetzel | Mar. 12, 1957 |
| 2,845,588 | Sampietro | July 29, 1958 |

OTHER REFERENCES

Neuzeitliche Drehstron-Fordermaschinen, by Erwin Feith and Herman Skiba, pp. 358–366 of Siemens Zeitschrift, Dec. 26, 1952, published in Siemens, Erlangen, Germany.

New A.C. Drives for Main Shaft Hoists, by Arnold and Wanne-Eickel, pp. 153–156 of Elektrotechnische Zeitschrift, March 1954, published in V D E Verlag, Bismarck Strasse 33, Berlin, Germany.